Figure 1:
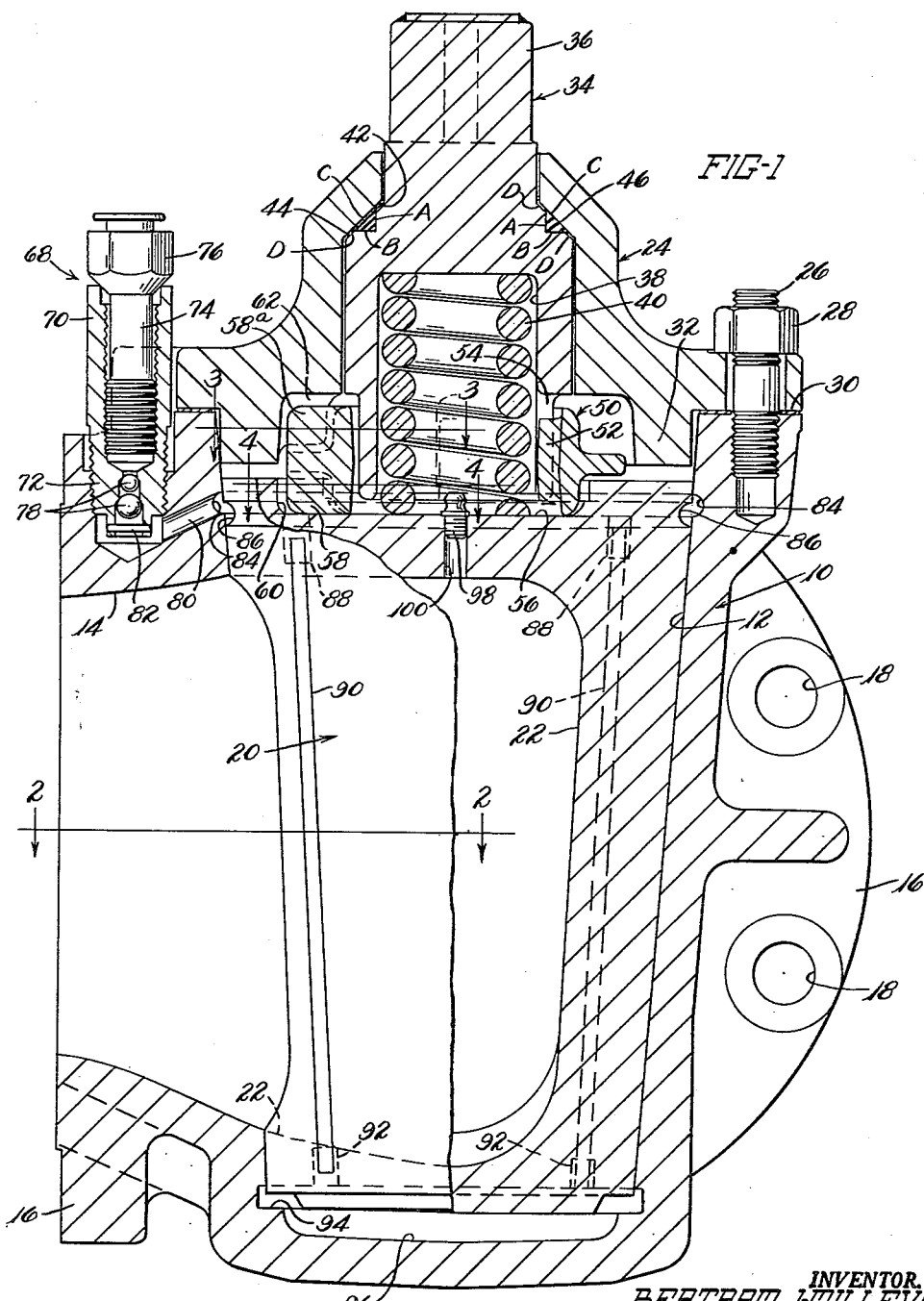

Aug. 28, 1962  B. J. MILLEVILLE  3,051,190
PLUG VALVE

Filed Jan. 26, 1960  3 Sheets-Sheet 1

INVENTOR.
BERTRAM J. MILLEVILLE
BY
Oldham & Oldham
ATTYS-

Aug. 28, 1962  B. J. MILLEVILLE  3,051,190
PLUG VALVE
Filed Jan. 26, 1960  3 Sheets-Sheet 2

INVENTOR.
BERTRAM J. MILLEVILLE
BY
Oldham & Oldham
ATTYS.

Aug. 28, 1962    B. J. MILLEVILLE    3,051,190
PLUG VALVE
Filed Jan. 26, 1960    3 Sheets-Sheet 3

INVENTOR.
BERTRAM J. MILLEVILLE
BY
Oldham & Oldham
ATTYS-

United States Patent Office 3,051,190
Patented Aug. 28, 1962

3,051,190
PLUG VALVE
Bertram J. Milleville, Wadsworth, Ohio, assignor to The Ohio Injector Company, Wadsworth, Ohio, a corporation of Ohio
Filed Jan. 26, 1960, Ser. No. 4,784
4 Claims. (Cl. 137—246.18)

This invention relates to plug valves, and more particularly, is concerned with valves using a tapered and lubricated rotary plug which may be substantially fully surrounded by the fluid controlled by the valve.

It is the general object of the invention to provide an improved, relatively inexpensive, long-lived and substantially maintenance-free valve utilizing a lubricated tapered plug substantially fully surrounded by the fluid controlled by the valve, and having provision for plug jacking, i.e. lifting, from its seat.

Another object of the invention is the provision of a valve of the character described in which castings requiring no machining or only a minimum of machining can be used for all essential valve parts including the body, the plug, the operating stem, equalizing means connecting the stem and plug, and the cover.

Another object of the invention is the provision of a valve such as described in which spring means are utilized to hold the plug against its seat in the body, and so designed as to preclude any need for adjustment of spring force at assembly or during subsequent service life, such spring means preferably serving also to hold the stem in sealing relation with the cover.

Another object of the invention is the provision in plug valve combination as herein defined of equalizer means rotatably interconnecting the stem and the plug but allowing axial misalignment thereof by a simple shifting of the equalizer means in its own plane and in one direction relative to the stem and at a right angle direction relative to the plug and still delivering completely balanced full torsional force between the stem and the plug when effecting rotary movement of the plug.

Another object of the invention is the provision of a tapered plug valve having the advantages heretofore set forth but constructed from substantially a minimum number of parts whereby the cost of the valve is kept comparatively low.

The foregoing objects of the invention, and other objects which will become apparent as the description proceeds, are achieved by the provision of the combination in a valve of a valve body having a tapered seat and a fluid passage therethrough intersecting the seat between the large and small ends thereof, a tapered plug rotatably received on the seat and having a fluid passage therethrough adapted to be substantially aligned with the fluid passage through the body, a stem substantially aligned with the large end of the plug but spaced axially therefrom, compression spring means between the stem and plug to resiliently press the plug on its seat, a cover rotatably receiving the stem which extends therethrough, said cover closing the valve body at the large end of the plug, means for releasably securing the cover to the body in fluid-tight relation, means for rotatably sealing between the stem and cover, equalizer means rotatably interconnecting the stem and plug, said equalizer means being capable of movement in its own plane to allow some misalignment of the stem and plug without disrupting the rotatable connection therebetween, a pressure lubricating fitting secured to the valve body, said valve body and plug having passages connecting the pressure fitting with the large and small end areas of the valve seat and with substantially the entire area of the small end of the plug when the plug is in fully closed or fully open position, and interengaging means limiting rotary movement between substantially fully opened and substantially fully closed positions. Usually the plug has a bore connecting the top of the plug with the passage through the plug and a check valve is positioned in the bore to allow flow of fluid from the top of the plug to the passage through the plug and to prevent flow in the reverse direction.

Figure 2:
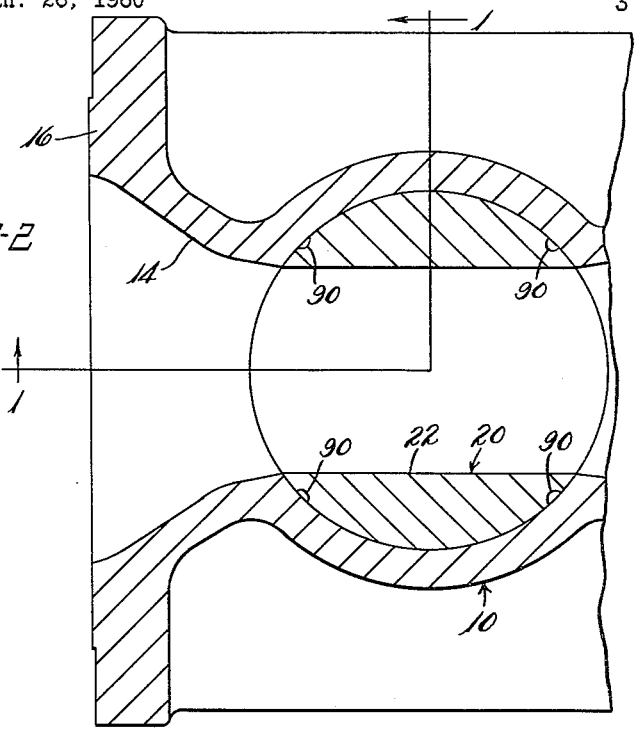
Figure 4:
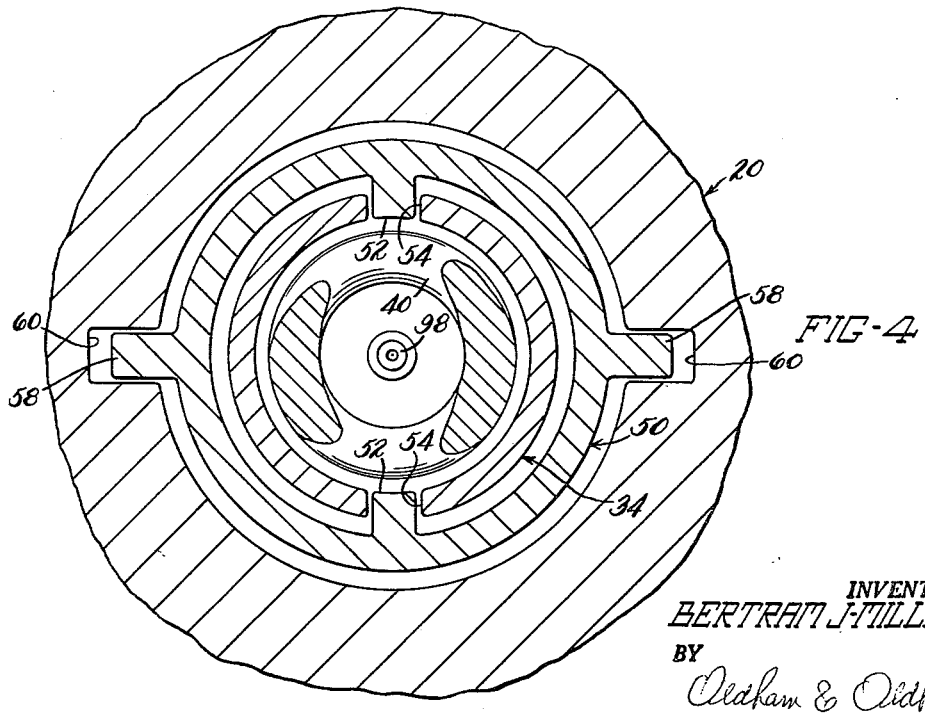
Figure 3:
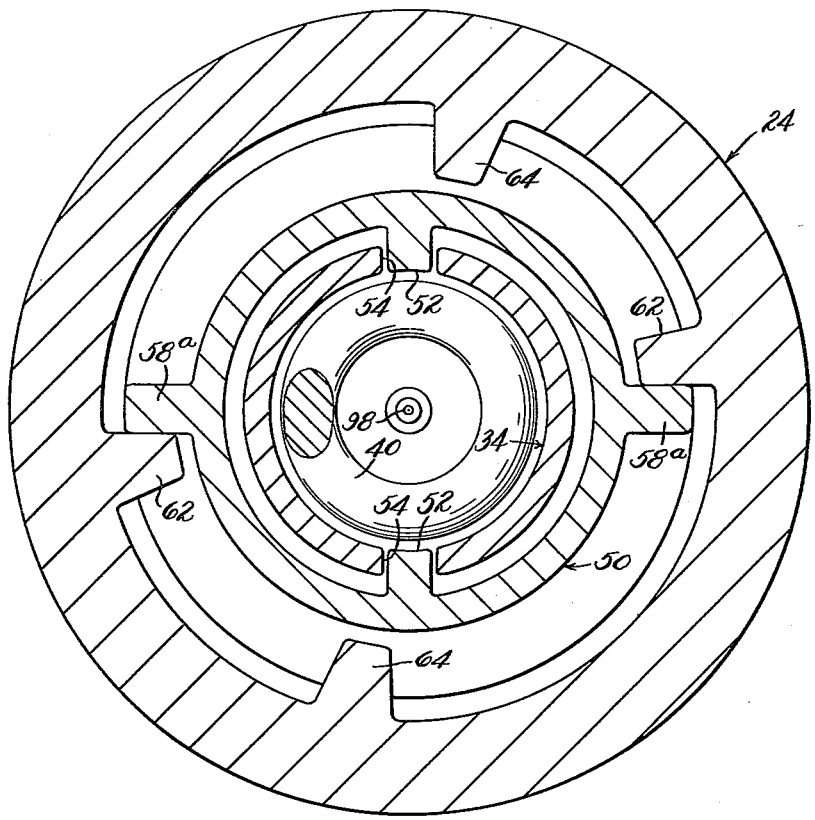

For a better understanding of the invention reference should be had to the accompanying drawings wherein FIG. 1 is a vertical cross-sectional view of a valve incorporating the principles of the invention and taken substantially on line 1—1 of FIG. 2;

FIG. 2 is a fragmentary horizontal cross-sectional view taken substantially on line 2—2 of FIG. 1;

FIG. 3 is a fragmentary horizontal cross-sectional view taken substantially on line 3—3 of FIG. 1, but extended over the full diameter, and illustrating the equalizer means splined to the stem and the stop means for limiting rotary movement of the stem; and FIG. 4 is a fragmentary horizontal cross-sectional view taken substantially on line 4—4 of FIG. 1, but extended over the full diameter, and illustrating the manner of splining or rotatably interconnecting the equalizer means and the plug.

In the drawings, the numeral 10 indicates generally the valve body provided with a tapered conical seat 12 and having an opening 14 therethrough for the passage of fluid to the valve, the passage 14 intersecting the seat 12 between the large and small ends thereof in the manner illustrated. As shown, the body 10 preferably closes the small end of the seat 12, but leaves the large end of the seat open. Fluid carrying conduits, not shown, are adapted to be secured to the valve body 10 at the ends of the passage 14 in any of the known or usual ways. In the form of the invention illustrated the valve body 10 is provided with substantially circular flanges 16 surrounding the passage 14 at each end thereof and is provided with bolt holes 18 in a well known manner for this purpose.

Rotatably received in the valve seat 12 is a conical plug, indicated as a whole by the numeral 20, and including a passage 22 through the plug adapted to be turned into substantial alignment with the passage 14 in the valve body when the valve is open or to be turned at right angles thereto to close the valve.

Closing the open top or area of the valve body 10 above the plug 20 or at the large end thereof is a cover indicated as a whole by the numeral 24 which is removably secured, as by threaded studs 26 and nuts 28 to the valve body 10 and with an interposed gasket 30 insuring a fluid-tight seal. The cover 24 is preferably made with a circular flange 32 fitting snugly in the large open end of the valve seat 12.

Rotatably carried by the cover 24 is an operating stem or shaft, indicated as a whole by the numeral 34, the stem extending out of the cover and being squared or otherwise formed at 36 to facilitate securing a wheel or operating handle, not shown, thereto. The portion of the stem 34 extending inwardly of the cover 24 is terminated axially short of the top of the plug 20 and is counter-bored at 38 to receive a compression spring 40 functioning to hold the plug 20 down on the valve seat 12 with substantial resilient force. In a six-inch valve the spring 40 can typically be of a strength to hold the plug 20 on the valve seat 12 with as much as 1,500 pounds force or more.

The spring 40 also serves to urge the stem 34 outwardly of the cover 24 with a corresponding force, and in the form of the invention shown this force is utilized to help effect the seal between the stem and the cover. More specifically, opposed conical surfaces 42 and 44 are provided on the cover and on the stem, these lying at an acute angle to the axis of the stem in the manner illustrated, and a tough, slippery plastic gasket 46 of ring shape is provided between the surfaces 42 and 44 in upstanding load bearing position.

A typical material for the gasket 46 is made and sold under the trademark "Teflon" by E. I. du Pont de Nemours & Company, this material being a relatively hard, fully fluorinated copolymer of ethylene and propylene, capable of supporting relatively heavy bearing loads, and having self-lubricating characteristics when operating against metal.

It should be observed that the physical properties of this and similar plastic materials are such that the requirements of high pressure service can be fulfilled only if the physical arrangement of the design provides virtually total confinement for the seal element. In the construction shown this confinement is provided by the cylindrical surface A, the shoulder B and the inward facing conical surface of the cover C. The only gaps in this confinement are the small spaces at the closest approach of B to C and A to C. In service the plastic seal material tends to be plastically deformed by loads in excess of its comparatively moderate compressive strength. Loads in the present application can be far in excess of this generally recognized strength criteria, and are sustained in a satisfactory manner only because of the near total confinement provided. Thus assuming the material to be under extreme load, the only points where plastic deformation is possible are the small spaces previously described. But if any flow occurs, plastic material is extruded in very thin layers in the narrow clearance space between surfaces C and D. Furthermore, in the process, this clearance must become progressively smaller, due to displacement of seal material out of its original confinement. It can be demonstrated by simple mechanical theory and by equally simple experiment, that a very thin film of any solid substance can sustain extremely high compressive loads without damage. It has been found by experience that if the clearance gaps are limited to approximately .007 inch or less there is very little tendency toward extrusion, even under extremely large loads. In the construction shown it is both desirable and convenient to maintain dimensions within this limitation.

Equalizing means are provided for rotatably interconnecting the stem 34 and the plug 20, these means functioning to transmit fully balanced torsional force between the stem and plug even when misalignment between these members occurs. Such misalignment results, for example, when relatively high fluid pressures are controlled by the valve and these pressures force the valve plug more tightly against one side of the valve seat 12 than against the other. The equalizer means, free to move in its own plane, preferably constitute an equalizer ring, indicated as a whole by the numeral 50. The equalizer ring surrounds the end of the stem 34 adjacent the plug 20, and the external diameter of the stem may be somewhat reduced in the manner illustrated in the area of the equalizer ring. Rotatably connecting the equalizer ring 50 to the stem 34 are spline means constituting radially inwardly directed and diametrically opposed lugs 52 which are slidably received in slots 54 in the end of the stem 34.

The equalizer ring 50 rests on top of the plug 20 or is positioned adjacent thereto, and this can be facilitated by the provision of a recess 56 in the top of the plug down into which the equalizer ring 50 loosely fits. Spline means rotatably interconnect the equalizer ring 50 and the plug 20 and these take the form of diametrically-opposed radially outwardly extending ears 58 formed on the equalizer ring which are received in recesses 60 formed in the top of the plug 20. The ears 58 are at substantially right angles to the lugs 52 in the manner best seen in FIG. 4. It will be noted that both FIGS. 3 and 4 illustrate completely diametrical cross sections whereas the section lines 3—3 and 4—4 on FIG. 1 extend substantially one-half of the diameter which has been necessitated by the right angle manner in which the section line 1—1 is taken on FIG. 2.

Means are provided for limiting the rotary movement of the plug 20 to approximately 90° representing travel from substantially fully opened to substantially fully closed position, and this is conveniently achieved by extending the ears 58 up or outwardly, as at 58a, and providing stops 62 and 64 on the inside of the cover which the extended ears 58a engage to limit the rotary movement of the plug 20 as desired.

Pressure lubricating mechanism, indicated as a whole by the numeral 68, is preferably utilized in conjunction with the valve, and such mechanism includes an internally threaded cylinder 70 having an externally threaded end received into a tapped opening 72 positioned in the valve body 10 to one side of the valve seat 12 near the large end thereof. Threaded into the internally threaded cylinder 70 is a screw 74 having an integral bolt head 76 to which a wrench can be applied so that as the screw 74 is turned down into the cylinder 70 the grease (not shown) in the cylinder is forced out past check valves 78 into passage 80. A diametrically positioned pin 82 in the bottom end of the cylinder 70 prevents the balls of the check valves from escaping.

The manner of lubricating the engaging area between the plug 20 and the valve seat 12 from the passage 80 is known and forms no part of the present invention per se, this being typically indicated in Nordstrom U.S. Patent No. 2,204,440. Suffice it to say here that the passage 80 connects to an annular groove 84 in the valve seat 12 which communicates with an annular groove 86 in the plug 20 and also communicates with short grooves 88 in the valve seat which engage with grooves 90 in the valve plug 20 when the plug is in fully closed or fully open position. The grooves 90 with the plug 20 in fully closed or fully open position engage with short grooves 92 in the valve seat connected to an annular groove 94 formed in the small end of the valve seat 12. The groove 94 opens into the exposed small end of the plug 20 should it be necessary to jack, i.e. lift, the plug 20 towards the larger end of the valve seat 12 in the event of sticking of the plug in the body. The body 10 of the valve is chamber-shaped as shown at 96 adjacent the small end of the plug 20 to insure the flow of lubricating pressure over the entire small end of the plug 20 for the purpose described.

Completing the combination of the valve of the invention, a check valve 98 is preferably provided together with a passage 100 between the top of the plug 20 and the passageway 22 therethrough. This allows excessive pressures on the top of the plug 20 to escape into the passage 22. Such pressures might otherwise build up on top of the plug 20, as in the hot sun, to force the plug 20 too tightly against the seat 12.

It is believed that the structure and operation of the valve will be fully understandable from the foregoing description. It might be noted here that in this type of valve that the fluid under pressure controlled by the valve normally works itself into the area or chamber between the large end of the plug 20 and the cover 24 and likewise into the area or chamber 96 adjacent or between the small end of the plug 20 and the body 10, the actual sealing function being accomplished at the seat port facing away from the source of higher pressure. Thus, the valve of the invention has the fluid substantially fully surrounding the plug with the plug semi-floating in the pressure. Accordingly, the pressure of the spring 40 holding the plug 20 on its seat becomes important as the primary seating force holding the plug 20 in its sealing position.

The equalizing means 50, free to float in its own plane insures balanced full torsion force between the stem 34 and the plug 20 even though these parts become misaligned. Lubrication for the plug 20 is provided by the lubricating mechanism 68, and the plug 20 can be lifted off of its seat by the pressure on the lubricating system should the plug freeze on the seat. The rotary seal between the stem 34 and the cover 24 is insured not only by the spring 40 but is further assisted by any fluid pressure established in the chamber at the top of the plug 20. Excess fluid pressure in this chamber is automatically relieved into the passage 22 through the plug 20 but pressure in the passage 22 of the plug cannot get through the check valve 98 to above the plug 20.

The simplicity of the relatively small number of parts in the complete valve particularly adapts them to economical manufacture by the use of castings with a minimum of machining.

While in accord with the patent statutes one best known embodiment of the invention has been illustrated and described in detail, it is to be particularly understood that the invention is not to be limited thereto or thereby, but that its scope is defined in the appended claims.

What is claimed is:

1. The combination in a valve of a valve body having a tapered seat open at its large end to the outside of the body, said body having a fluid passage therethrough intersecting the seat between the bottom and top thereof, a tapered plug rotatably received on the seat and having a fluid passage therethrough adapted to be substantially aligned with the fluid passage through the body or turned at an angle to close the fluid passage through the body, a stem substantially aligned with the large end of the plug but spaced axially therefrom, the end of the stem adjacent the plug being axially counterbored, a compression spring received in the counterbored stem and engaging with the plug to resiliently press the plug on its seat, a cover rotatably receiving the stem which extends therethrough, said cover closing the valve body at the large end of the plug, means for releasably securing the cover to the body in fluid tight relation, opposed annular surfaces on the stem and cover inclined to the axis of the stem, an annular gasket of tough, slippery plastic carried by one of the inclined surfaces and engaging with the other to fluid seal the stem in the cover, an equalizer ring surrounding the lower end of the stem and resting on the top of the plug, integral diametrically-opposed lugs on the equalizer ring extending radially-inwardly into diametrically-opposed slots formed in the end of the stem adjacent the plug, integral diametrically-opposed ears on the equalizer ring and extending radially outwardly into diametrically-opposed recesses formed in the top of the plug, said lugs and said ears on the equalizer ring being at substantially right angles to each other, the plug having a bore connecting the top of the plug with the passage through the plug, a check valve in the bore allowing flow of fluid from the top of the plug to the plug passage, a pressure lubricating fitting secured to the side of the valve body, said valve body and plug having passages connecting the pressure fitting with upper and lower areas of the valve seat and with substantially the entire area of the small end of the plug, and interengaging means between the equalizer ring and the cover limiting rotary movement of the plug between substantially fully open and substantially fully closed positions.

2. The combination in a valve of a valve body having a tapered seat open at its large end to the outside of the body, said body having a fluid passage therethrough intersecting the seat between the large and small ends thereof, a tapered plug rotatably received on the seat and having a fluid passage therethrough adapted to be substantially aligned with the fluid passage through the body or turned at an angle to close the fluid passage through the body, a stem substantially aligned with the large end of the plug but spaced axially therefrom, the end of the stem adjacent the plug being axially counterbored, a compression spring received in the counterbored stem and engaging with the plug to resiliently press the plug on its seat, a cover rotatably receiving the stem which extends therethrough, said cover closing the valve body at the large end of the plug, means for releasably securing the cover to the body in fluid tight relation, means for rotatively sealing between the stem and cover, an equalizer ring surrounding the lower end of the stem and resting on the top of the plug, integral diametrically-opposed lugs on the equalizer ring extending radially-inwardly into diametrically-opposed slots formed in the end of the stem adjacent the plug, integral diametrically-opposed ears on the equalizer ring and extending radially outwardly into diametrically-opposed recesses formed in the top of the plug, said lugs and said ears on the equalizer ring being at substantially right angles to each other, the plug having a bore connecting the top of the plug with the passage through the plug, a check valve in the bore allowing flow of fluid from the top of the plug to the plug passage, a pressure lubricating fitting secured to the side of the valve body, said valve body and plug having passages connecting the pressure fitting with large and small end areas of the valve seat and with substantially the entire area of the small end of the plug, and interengaging means between the equalizer ring and the cover limiting rotary movement of the plug between substantially fully open and substantially fully closed positions.

3. The combination in a valve body having a tapered seat open at its large end to the outside of the body, said body having a fluid passage therethrough intersecting the seat between the large and small ends thereof, a tapered plug rotatably received on the seat and having a fluid passage therethrough adapted to be substantially aligned with the fluid passage through the body or turned at an angle to close the fluid passage through the body, a stem substantially aligned with the large end of the plug but spaced axially therefrom, the end of the stem adjacent the plug being axially counterbored, a compression spring received in the counterbored stem and engaging with the plug to resiliently pass the plug on its seat, a cover rotatably receiving the stem which extends therethrough, said cover closing the valve body at the large end of the plug, means for releasably securing the cover to the body in fluid tight relation, means for rotatively sealing between the stem and cover, an equalizer ring surrounding the lower end of the stem and positioned adjacent to the top of the plug, integral diametrically-opposed lugs on the equalizer ring extending radially-inwardly into diametrically-opposed slots formed in the end of the stem adjacent the plug, integral diametrically-opposed ears on the equalizer ring and extending radially outwardly into diametrically-opposed recesses formed in the top of the plug, said lugs and said ears on the equalizer ring being at substantially right angles to each other, the plug having a bore connecting the top of the plug with the passage through the plug, a check valve in the bore allowing flow of fluid from the top of the plug to the plug passage, a pressure lubricating fitting secured to the valve body, said valve body and plug having passages connecting the pressure fitting with large and small end areas of the valve seat and with substantially the entire area of the small end of the plug and interengaging means limiting rotary movement of the plug between substantially fully open and substantially fully closed positions.

4. The combination in a valve of a valve body having a tapered seat open at its large end to the outside of the body, said body having a fluid passage therethrough intersecting the seat between the large and small ends thereof, a tapered plug rotatably received on the seat and having a fluid passage therethrough adapted to be substantially aligned with the fluid passage through the body or turned at an angle to close the fluid passage through the body, a stem substantially aligned with the large end of the plug but spaced axially therefrom, the end of the stem adjacent the plug being axially counterbored, a compression spring received in the counterbored stem and engaging with the plug to resiliently press the plug on its seat, a cover rotatably receiving the stem which extends therethrough, said cover closing the valve body at the large end of the plug, means for releasably securing the cover to the body in fluid tight relation, means for rotatively sealing between the stem and cover, an equalizer ring surrounding the lower end of the stem and positioned adjacent to the top of the plug, integral diametrically-opposed lugs on the equalizer ring extending radially-inwardly into diametrically-opposed slots formed in the end of the stem adjacent the plug, integral diametrically-opposed ears on the equalizer ring and extending radially outwardly into diametrically-opposed recesses formed in the top of the plug, said lugs and said ears on the equalizer ring being at substantially right angles to each other, a pressure lubricating fitting secured to the valve body, said valve body and plug having passages connecting the pressure fitting with large and small end areas of the valve seat and with substantially the entire area of the small end of the plug, and interengaging means limiting rotary movement of the plug between substantially fully open and substantially fully closed positions.

References Cited in the file of this patent

UNITED STATES PATENTS

| | | |
|---|---|---|
| 871,956 | Rice | Nov. 26, 1907 |
| 1,791,914 | Tomlinson | Feb. 10, 1931 |
| 2,060,209 | Heckert | Nov. 10, 1936 |
| 2,204,440 | Nordstrom | June 11, 1940 |
| 2,738,799 | Mueller | Mar. 20, 1956 |
| 2,815,766 | Mueller | Dec. 10, 1957 |